United States Patent
Burger et al.

(10) Patent No.: US 7,840,555 B2
(45) Date of Patent: Nov. 23, 2010

(54) SYSTEM AND A METHOD FOR IDENTIFYING A SELECTION OF INDEX CANDIDATES FOR A DATABASE

(75) Inventors: Louis Burger, Escondido, CA (US); Frank Roderic Vandervort, Ramona, CA (US)

(73) Assignee: Teradata US, Inc., Miamisburg, OH (US)

( * ) Notice: Subject to any disclaimer, the term of this patent is extended or adjusted under 35 U.S.C. 154(b) by 482 days.

(21) Appl. No.: 11/530,991

(22) Filed: Sep. 12, 2006

(65) Prior Publication Data

US 2007/0067261 A1 Mar. 22, 2007

Related U.S. Application Data

(60) Provisional application No. 60/718,836, filed on Sep. 20, 2005.

(51) Int. Cl.
*G06F 7/00* (2006.01)
*G06F 17/30* (2006.01)

(52) U.S. Cl. .................................... 707/715
(58) Field of Classification Search ................. 707/715
See application file for complete search history.

(56) References Cited

U.S. PATENT DOCUMENTS

| | | | | |
|---|---|---|---|---|
| 5,668,966 A | * | 9/1997 | Ono et al. | 715/853 |
| 5,899,986 A | * | 5/1999 | Ziauddin | 707/2 |
| 5,926,813 A | * | 7/1999 | Chaudhuri et al. | 707/5 |
| 6,230,153 B1 | * | 5/2001 | Howard et al. | 707/2 |
| 6,449,605 B1 | * | 9/2002 | Witkowski | 707/3 |
| 2005/0060311 A1 | * | 3/2005 | Tong et al. | 707/7 |
| 2005/0192943 A1 | * | 9/2005 | Siddiqui et al. | 707/3 |
| 2005/0234900 A1 | * | 10/2005 | Bossman et al. | 707/4 |
| 2006/0259621 A1 | * | 11/2006 | Ranganathan et al. | 709/226 |

* cited by examiner

*Primary Examiner*—John R. Cottingham
*Assistant Examiner*—Nicholas E Allen

(57) ABSTRACT

A system and method for identifying a selection of index candidates for a relational database. The system includes a Predicate Analyzer for examining database queries in workload and recording column and predicate information; a Search Engine for performing a combinatorial search of index candidates; an Index Emulator for emulating the existence of a set of candidate indexes by making necessary "fake" entries into the relational database management system data dictionary; and a Query Optimizer for estimating the cost of a given query within a given index configuration. In accordance with the method, data indicative of a workload comprising one or more queries is received, and predicates are then analysed and organized into column groups for each basic predicate type. Statistics are collected on each of these groups. Non-predicate portions of each query are scanned to obtain additional covering columns. A combinational search is performed on the column groups to identify covering and non-covering candidates. These are then used in conjunction with collected statistics and baseline costs are calculated to perform a cost bases analysis of the candidates and generate index candidate recommendations.

16 Claims, 5 Drawing Sheets

SYSTEM AND A METHOD FOR IDENTIFYING A SELECTION OF INDEX CANDIDATES FOR A DATABASE

CROSS REFERENCE TO OTHER APPLICATIONS

This application claims priority under 35 U.S.C. §119(e) to the following and commonly-assigned patent application, which is incorporated herein by reference: U.S. Provisional Application Ser. No. 60/718,836, entitled "A System and Method for Identifying a Selection of Index Candidates for a Database," filed on Sep. 20, 2005.

BACKGROUND

Any discussion of the prior art throughout the specification should in no way be considered as an admission that such prior art is widely known or forms part of common general knowledge in the field.

Physical database design is an essential step to implementing a high performance data warehouse. In particular, users must make choices regarding the physical characteristics of their relational tables and columns. Such choices typically include indexes, partitioning strategies, and summary tables. The process of making these choices manually is difficult and mistaken prone, even for experienced users. For this reason, Database Management Systems (DBMS) vendors often provide tools—often referred to as "wizards"—that make recommendations directed towards physical database design. Known tools are relatively rudimentary, and limited to recommending simple structures such as secondary indexes.

Many DBMS vendors offer relatively advanced index structures that store and maintain derived data. Such index structures are commonly referred to as "materialized views" and are used to store a subset of a table's rows and columns, pre-joined results, or aggregated data. One of the major drawbacks of materialized views is their complexity and the resulting difficulty users have in defining them for their particular workload.

Identifying materialized views having particular characteristics is particularly challenging because of the large number of candidate views. Indeed, it generally not feasible to search and analyze the entire solution space due to the excessive amount of CPU resources and time that would be required.

SUMMARY OF THE INVENTION

It is an object of the present invention to overcome or ameliorate at least one of the disadvantages of the prior art, or to provide a useful alternative.

In accordance with a first aspect of the invention, there is provided a system for identifying a selection of index candidates for a database, the system including an interface for receiving data indicative of a workload defined by a plurality of queries; and an analyzing processor responsive to the data for identifying a selection of index candidates.

In accordance with a second aspect of the invention, there is provided a method for identifying a selection of index candidates for a database, the method including the steps of receiving data indicative of a workload defined by a plurality of queries; and analyzing the data for identifying a selection of index candidates.

BRIEF DESCRIPTION OF THE DRAWINGS

The benefits and advantages of the present invention will become apparent to those skilled in the art to which this invention relates from the subsequent description of exemplary embodiments and the appended claims, taken in conjunction with the accompanying drawings, in which:

DETAILED DESCRIPTION OF THE PREFERRED EMBODIMENTS

Figure 1:
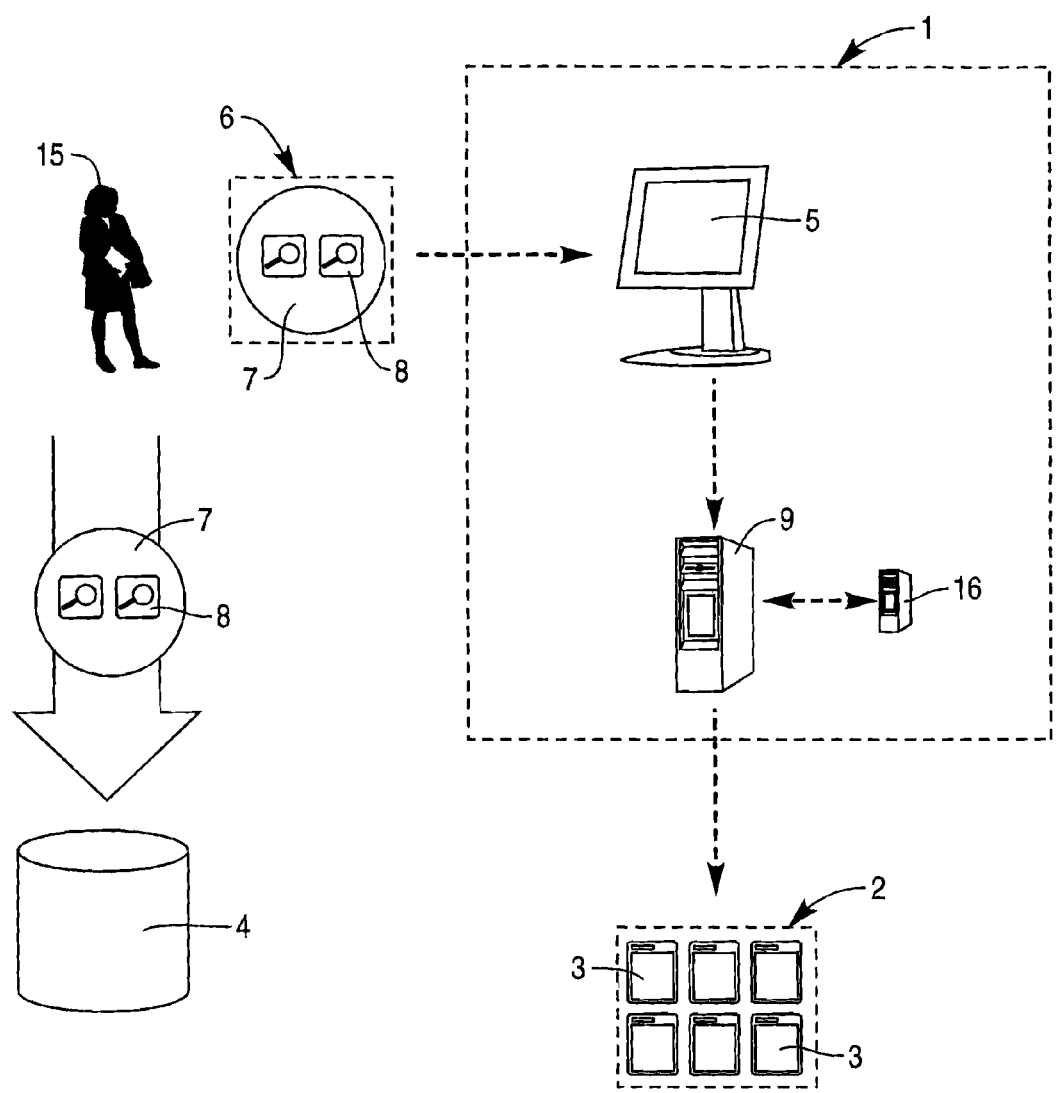
FIG. 1 is a schematic view of a system according to the invention.

Referring to the drawings, it will be appreciated that, in the different figures, corresponding features have been denoted by corresponding reference numerals.

Referring initially to FIG. 1, there is provided a system 1 for identifying a selection 2 of index candidates 3 for a database 4. System 1 includes an interface 5 for receiving data 6 indicative of a workload 7 defined by a plurality of queries 8. System 1 further includes an analysing processor 9 responsive to data 6 for identifying the selection 2 of index candidates 3.

The illustrated embodiments are described by particular reference to a Teradata Relational Database Management Systems (RDBMS), such as Teradata V2R5 and V2R6. Teradata is a trademark of NCR corporation. The embodiments are not limited by the use of Teradata RDBMS, and are applicable to a variety of alternate systems making use of other databases and/or DBMS. In particular, embodiments of the invention are particularly suitable to other SQL type databases. Although components of Teradata V2R5 and V2R6 are referred to herein, these should not be taken as limiting, and those skilled in the art will readily recognise corresponding components that are used in alternate implementations. Further, examples of SQL code provided below are intended to be indicative only, and those skilled in the art will recognise various modifications and variations that are made to such code in alternate implementations. Systems utilising such variations, modifications, or alternatives should not be regarded as being beyond the scope of the present disclosure.

Workload 7 is defined by a set of queries 8 that a user 15 runs through database 4, as schematically represented on the left hand side of FIG. 1. In some embodiments these queries include customer transactions, tactical queries, database entry modification, and the like. In the illustrated embodiment, workload 7 is defined by only two queries 8, which are described in detail below for the sake of example. It will be appreciated that the small number of queries 8 in this embodiment is for the sake of simplicity. In many practical embodiments workload 7 is defined by a much larger number of queries, spanning several orders of magnitude or more. Embodiments of the present invention are readily able to handle such large workloads.

Although user 15 is graphically represented as an individual, user 15 is meant to designate a plurality of individual users of database 2. In broad terms, user 2 designates the party using system 1. In some embodiments user 2 is an automated process that runs periodically either at predetermined times or in response to a command to invoke the operation of system 1.

Data 6 is indicative of workload 7 to the extent that the precise nature of queries 8 is extractable from data 6. In the present embodiment data 6 is a table having entries containing the SQL code for each of queries 8. Alternate techniques for containing the relevant information in data 6 are used in other embodiments.

User 15 provides data 6 to interface 5. Interface 5 represents an input mechanism of system 1. In the present embodiments interface 5 is a shell of a software application, which includes a Graphical User Interface (GUI) that provides a mechanism for conveniently identifying and receiving the table defining data 6. Alternate interfaces are used in other embodiments. Fore example, in some embodiments application 5 is a background functionality invoked by running a particular script or code through a suitably adapted console.

Processor 9 is responsive to data 6 for identifying the selection 2 of index candidates 3. In the present embodiment, the index candidates include primary index candidates. As is the norm in an SQL environment, each query 8 includes a WHERE clause having one or more predicates. Processor 9 analyses the predicates to identify one or more basic predicate types for workload 7. Processor 9 then organizes the predicates into column groups for each basic predicate type. These column groups include value access groups and join access groups.

In addition to value access groups and join access groups, there is a third group type: additional covering columns. These represent other columns appearing in each query. Processor 9 scans the remaining non-predicate portions of each query to identify all additional columns. Like value access and join access groups, additional covering columns are organized and/or separated by query and their respective owning table.

For the sake of example, consider workload 8 to be defined by the following queries 8:

First Example Query:

SELECT t1.f, t1.g, t2.col, t3.col
FROM t1, t2, t3
WHERE t1.a = 10 AND t1.b = 20 AND
t1.c = t2.c and t1.d = t2.d and t2.e = t3.e;

Second Example Query:

SELECT t1.f, t1.h
FROM t1
WHERE t1.c = 'B100' and t1.d = 'C200'

System 1 is used in relation to table t1. There are value access conditions on column sets (a,b) and (c,d), and join access conditions on column sets (c,d). The additional covering columns are (f,g) and (h).

Processor 9 includes a search engine 16 for performing a combinatorial search on the groups to reveal combinations, wherein each combination represents an alternative partitioning scheme. Search engine 16 then identifies one or more index candidates for each partitioning scheme, each candidate having a primary index column.

In a parallel environment such as Teradata, one such category consists of those candidates that represent alternative methods of data partitioning. Each Teradata base table is defined with exactly one partitioning method that is specified via the PRIMARY INDEX clause during table creation. The choice of primary index is very important to query performance because it allows queries with value conditions on the primary index column or columns to be executed on only a single partition and queries with join conditions on the primary index column or columns to execute in place without having to redistribute data between processors. Furthermore, it is very often the case that a given table will have numerous primary index candidates each of which result in improved performance to certain queries in workload 7. The Teradata RDBMS as it stands in Teradata V2R5 and V2R6 supports materialized views by a Join Index feature. Join Indexes provide a method of supporting multiple partitioning schemes for one set of data. The basic syntax for defining Join Indexes in Teradata is:

CREATE JOIN INDEX AS <query> PRIMARY
    INDEX <column_list> where <query> is the standard SQL SELECT statement. The <query> specification allows the index to contain a subset of the columns and rows from a specified base table, such as t1. The PRIMARY INDEX clause allows users to define a partitioning key that is different than the underlying base table. In the Teradata partitioned parallel environment, the primary index is used to hash distribute a table's rows across multiple processors.

In the present example, the candidates identified by search engine 16 are:
    Join Index with PRIMARY INDEX (a).
    Join Index with PRIMARY INDEX (b).
    Join Index with PRIMARY INDEX (a,b).
    Join Index with PRIMARY INDEX (c).
    Join Index with PRIMARY INDEX (d).
    Join Index with PRIMARY INDEX (c,d).

It will be appreciated that, in addition to a PRIMARY INDEX clause, each Join Index candidate must have a defined SELECT list consisting of one or more simple columns, or alternatively the keyword ROWID.

If a Join Index contains all of a table's columns referenced in a given query, then the Join Index can be used to "cover" the query meaning the base table need not be accessed. Because there is little benefit from partial covering, there is no need to consider all combinations of other columns appearing in the query. A covering candidate is defined by a candidate SELECT list containing the primary index column or columns and any remaining table columns or columns referenced by a particular one of the queries. In many situations, covering Join Indexes significantly reduces the time and cost of executing queries. That being said, there are drawbacks: more space is occupied, and more maintenance is required during updates. For this reason, those columns that exceed a user specified threshold for update frequency are removed from covering consideration as are those candidate Join Indexes that would exceed a user specified space limit. In the present example, the covering candidates identified by search engine 16 are:
    Join Index with SELECT list (a,f,g,h) and PRIMARY
        INDEX (a).
    Join Index with SELECT list (b,f,g,h) and PRIMARY
        INDEX (b).
    Join Index with SELECT list (a,b,f,g,h) and PRIMARY
        INDEX (a,b).
    Join Index with SELECT list (c,f,g,h) and PRIMARY
        INDEX (c).
    Join Index with SELECT list (d,f,g,h) and PRIMARY
        INDEX (d).
    Join Index with SELECT list (c,d,f,g,h) and PRIMARY
        INDEX (c,d).

The SELECT list of Join Index candidates representing non-covering candidates consists of the primary index columns for the current candidate and the keyword ROWID.

That is, a non-covering candidate is defined by a candidate SELECT list containing the primary index column or columns and the keyword ROWID. The non-covering case has the advantage of minimizing the space occupied by the Join Index as well as the cost to maintain it during updates. The drawback of non-covering candidates is the extra time required to fetch the other referenced columns from the underlying base table. In the present example, the non-covering candidates identified by search engine 16 are:

- Join Index with SELECT list (a, ROWID) and PRIMARY INDEX (a).
- Join Index with SELECT list (b, ROWID) and PRIMARY INDEX (b).
- Join Index with SELECT list (a,b,ROWID) and PRIMARY INDEX (a,b).
- Join Index with SELECT list (c,ROWID) and PRIMARY INDEX (c).
- Join Index with SELECT list (d,ROWID) and PRIMARY INDEX (d).
- Join Index with SELECT list (c,d,ROWID) and PRIMARY INDEX (c,d).

In the present embodiment, the above-detailed covering and non-covering candidates make up selection 2. Although covering and non-covering candidates are both identified in this example, in some embodiments a decision is made to exclusively identify one or the other.

In summary, where a given value access or join access group consists of M columns, there are (2M−1) different combinations of those columns each representing a candidate PRIMARY INDEX for a Join Index Candidate. Furthermore, each of these candidates is either made to be covering or non-covering. It will be appreciated adding the additional covering columns for that particular table to the Join Index SELECT list makes a candidate covering, and adding the keyword ROWID to the Join Index SELECT list makes a candidate non-covering.

In this case, the total size of the search space of Join Index candidates for a given table calculated by the following pseudo code:

```
size = 0
for i = 1 to N
    size = size + ((2^Mi) − 1) * 2
``` where N represents the total number of value access groups and join access groups, and Mi represents the number of columns in group i.

Thus, the task of the search engine 16 is to perform a combinatorial search on the solution space defined above. In this embodiment, the search engine enumerates sets of candidate indexes for each table where the size of each set is based on a user specified setting which denotes the maximum number of new indexes to recommend for a given table. Each set is then costed and ranked as described below.

Figure 2:
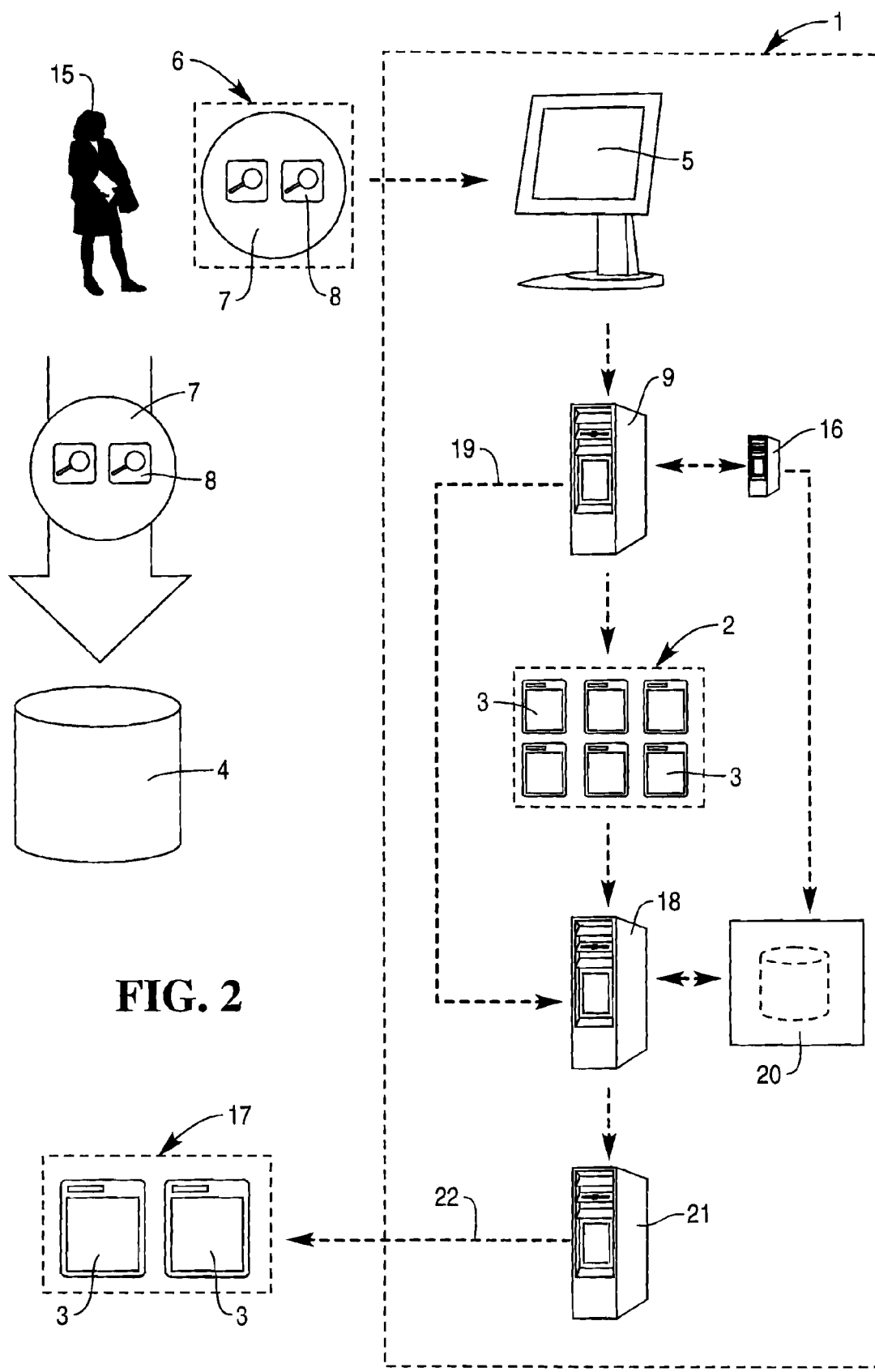
FIG. 2 is a schematic view of a further system according to the invention.

In the embodiment of FIG. 2, system 1 carries out further some processing on selection 2 to derive a further selection 17. Selection 17 is a subset of selection 2 that represents the two candidates 3 that result in the lowest workload costs. It will be appreciated that, in other embodiments, this further processing identifies an alternate reduced selection of candidates. For example, the least cost-effective candidates.

To carry out the further processing, system 1 includes a costing processor 18 for estimating a workload cost for each index candidate in selection 2. To assist in the calculation of cost estimates, processor 9 collects statistics 19 on one or more column groups, to which processor 18 is responsive for estimating the workload cost. It will be appreciated that, in other embodiments, the collection of statistics is performed by a component other than processor 9. Suitable applications, components and hardware for estimating the cost of running queries will be known to those skilled in the art. It is particularly noted that, in the present embodiment, statistics are only collected on the value access groups and join access groups, and not on the additional covering columns.

System 1 includes an emulator 20 for providing simulations of the behaviour of the index candidates in the selection. Processor 18 uses the simulations for estimating the workload costs. That is, emulator 20 provides a simulation based on an implementation of a particular candidate 3 from selection 2, and processor 18 calculates the cost of running each query 8 under that candidate. In the present embodiment emulator 20 operates in response to a command from the search engine, however in other embodiments alternate commands are utilised. The respective costs of running queries 8 under a particular candidate 3 are summed to derive an estimated workload cost for workload 7 under that particular candidate 3. The process is repeated for each candidate 3. As such, data is available to create a report detailing the workload costs associated with each of candidates 3.

System 1 includes a ranking processor 21 that is responsive to costing processor 18 for relatively ranking selection 2 based on the estimated workload costs, and from this deriving selection 17 in accordance with a predefined protocol. As mentioned above, the protocol in this embodiment involves selecting the two candidates 3 with the lowest costs. Alternate approaches are adopted in other embodiments. Processor 21 transmits a signal 22 indicative of selection 17. This will be recognised as a recommendation to user 15 of the most suitable indexing candidates identified for workload 7, following a cost-based analysis. User 15 is then able to modify the physical design of database 4 for improved efficiency based on the recommendations. In some embodiments, system 1 provides a tool for automatically or selectively modifying the physical design based on the recommendations.

Throughout the specification, reference is made to various components of system 1. These components are leveraged from other software applications in some embodiments. In some cases, a single software application handles one or more functionalities of one or more of the components. As such, the components should be read conceptually as defined by their respective functionalities rather than as necessarily discrete units.

Figure 3:
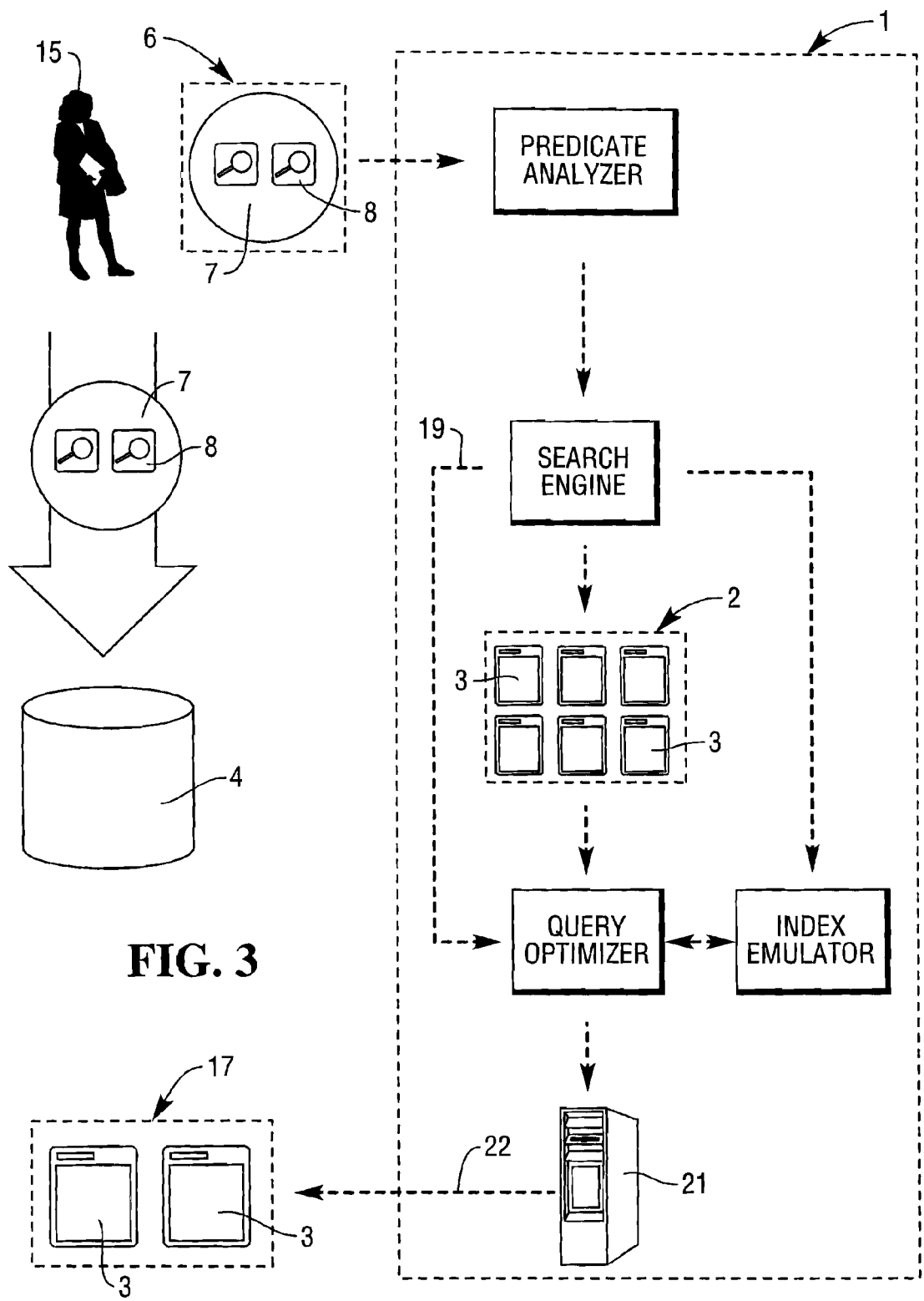
FIG. 3 is a schematic view of a further embodiment.

Referring to FIG. 3, system 1 is conveniently implemented by leveraging known Teradata components. That is, the functionality required to carry out the processes of system 1 are taken on by these known components, noting that some of the known components will require some modification and/or instruction in light of the rules and heuristics unique to system 1. The known components that are leveraged are:

Predicate Analyzer: This Optimizer component is capable of examining each query 8 in workload 7 and recording column and predicate information that is useful for the subsequent search phase. This component is the same one used by Query Optimizer to identify predicates and columns that are eligible for indexed access. Using the same component for system 1 ensures the quality of the columns that will be considered as index candidates.

Search Engine: This component is capable of performing a combinatorial search of the index candidates.

Index Emulator: This component is capable of emulating the existence of a set of candidate indexes by making necessary "fake" entries in the RDBMS data dictionary. It is capable of simulating any configuration of existing and/or candidate indexes.

Query Optimizer: This component is capable of estimating the cost of a given query within a given index configuration. When running as part of system 1, the Query Optimizer behaves as if the candidate "fake" indexes stored in the dictionary actually exist.

In embodiments that do not include these components other components with similar functionalities are able to be used. Such components will be recognised by those skilled in the art.

The Predicate Analyzer component is first called to analyze the predicates appearing in the WHERE clause of each query and organize them into column groups for each basic predicate type including value and join access. Statistics are then collected on the columns identified by the Predicate Analyzer. These statistics are used to improve the accuracy of the subsequent Query Optimizer cost estimates. For the sake of expediency, statistics are collected on only a sample of the data. The Search Engine component is called to perform a combinatorial search on the groups of value and join access columns where each combination represents an alternative partitioning scheme. For each partitioning scheme the covering and non-covering candidates are identified. The Search Engine then calls the Emulator component for each index candidate and the Query Optimizer is then called to choose the best execution plan for the current set of existing and candidate indexes. The cost of the chosen plan is recorded and the candidates that result in the lowest workload cost are retained as the final recommendations.

Figure 4:
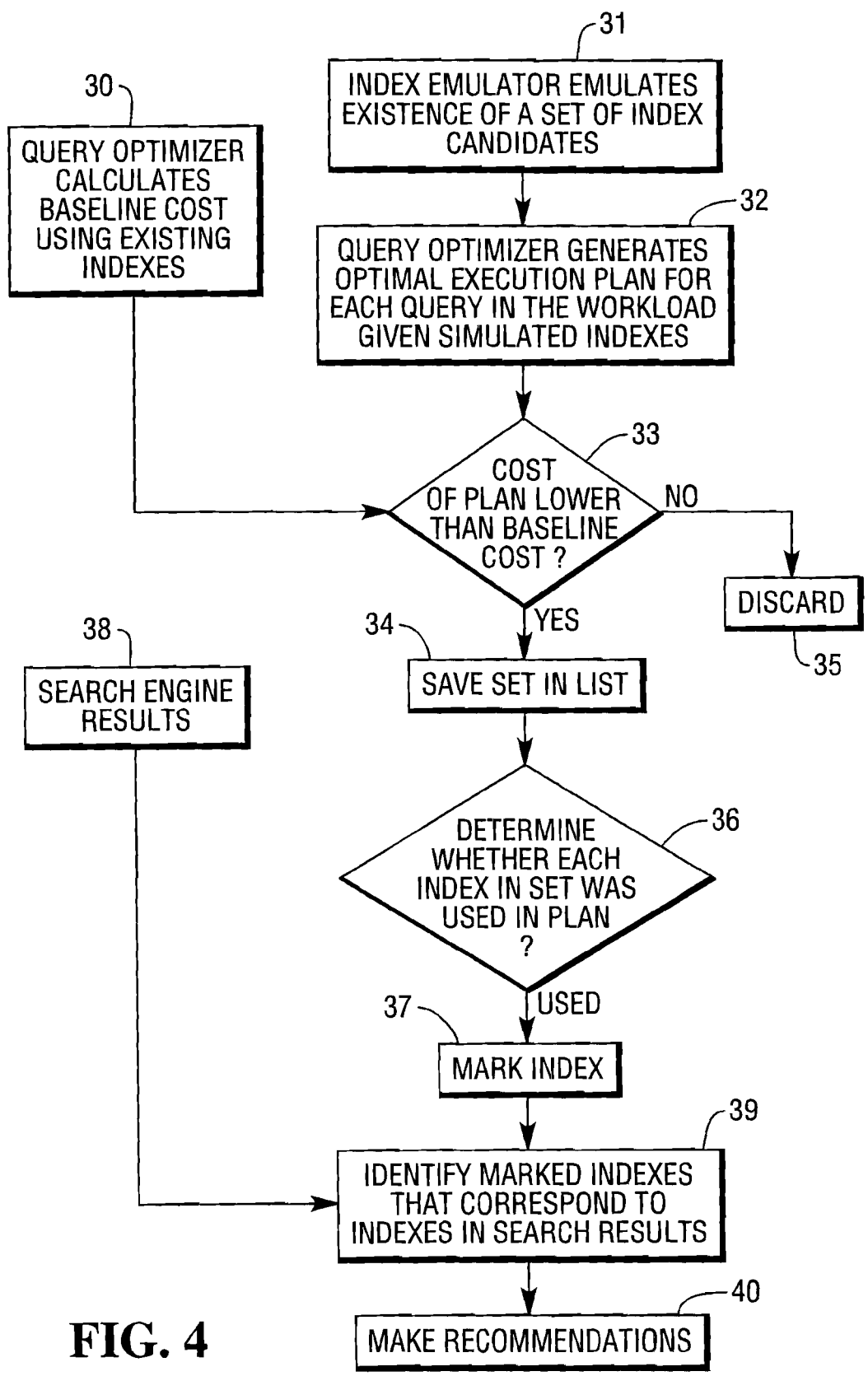
FIG. 4 is a flowchart illustrating an option for cost based analysis.

In this embodiment, the cost based analysis is performed in accordance with the method of FIG. 4. To commence, Query Optimizer is called for each query 8 in workload 7 at 30. This is often performed prior to performing the combinatorial search. Query Optimizer calculates the workload cost for workload 7 on the basis of an existing set of real indexes. That is, a set of indexes pre-existing user defined indexes. This workload cost defines a baseline cost that system 1 should attempt to improve upon.

The Index Emulator component is called to simulate the existence of each candidate index in the data dictionary of database 4 at 31. The Query Optimizer component is then called to generate the optimal execution plan for each query in the workload with the simulated indexes defined at 32. The returned execution plan includes an estimated total cost along with information about which candidate indexes were used in the chosen plans, and those which were not used in the chosen plans. At 33 the estimated cost based on the simulated set of candidate indexes is compared to the baseline cost. If the estimated cost is lower than the baseline cost, then that set of indexes is saved in a list at 34. Otherwise the set is discarded at 35. At 36 indexes are checked to determine whether they were actually used by the Optimizer in the optimal execution plan. Those that were used are marked at 37. If a particular index was not used, it is not marked and no action is taken.

Search Results 38 from the combinatorial search are compared to the list including one or more marked indexes at 39. After the Search Engine component finishes its task, the best candidate set for each table is known. Those indexes within these sets that were both saved in the list by Optimizer and also marked form the set of final recommendations at 40.

Figure 5:
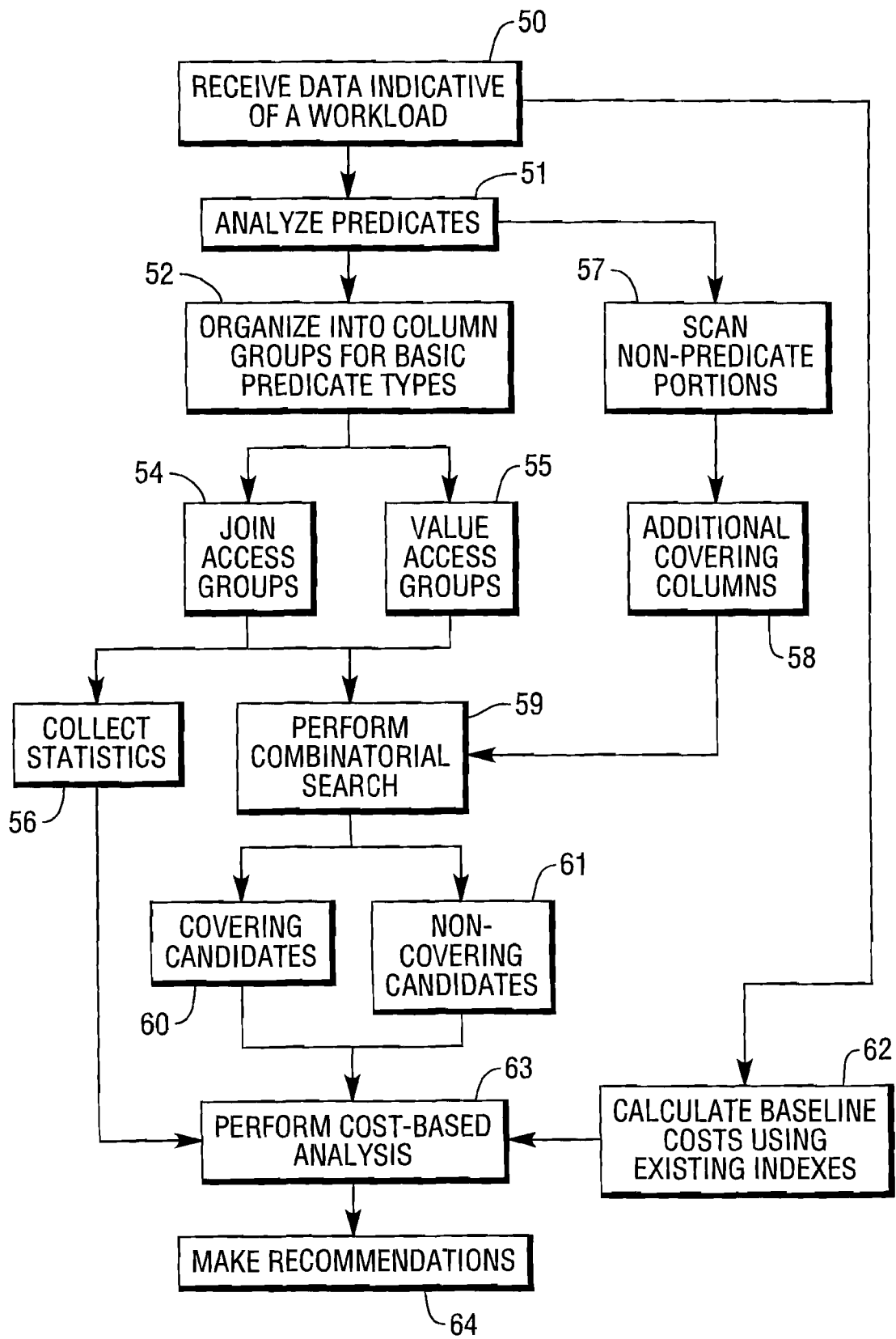
FIG. 5 is a flowchart depicting an exemplary method according to the invention.

FIG. 5 illustrates an exemplary method according to an embodiment of the present invention. Data indicative of a workload comprising one or more queries is received at 50. The predicates are then analysed at 51. Following this, predicates are organized into column groups for each basic predicate type at 52, being join access groups 54 and value access groups 55. Statistics are collected on each of these groups at 56.

The non-predicate portions of each query are scanned at 57 to obtain the additional covering columns 58. These, along with groups 54 and 55, are used as part of the combinatorial search at 59. Covering candidates 60 and non-covering candidates 61 are identified. These are then used in conjunction with statistics collected at 56 and baseline costs calculated at 62 to perform a cost bases analysis of the candidates at 63. It will be appreciated that although the calculation of baseline costs 62 is shown to be prompted by step 50, step 62 is performed at varying times among embodiments. Analysis 63 is carried out along a number of lines depending on the precise embodiment, including the method disclosed in FIG. 4. Finally, recommendations are made at 64.

Although the present invention has been described with particular reference to certain preferred embodiments thereof, variations and modifications of the present invention can be effected within the spirit and scope of the following claims.

What is claimed is:

1. A system for identifying a selection of index candidates for a database, the system including:
   an interface for receiving data indicative of a workload defined by a plurality of queries; and
   an analysing processor responsive to the data for identifying a selection of index candidates, wherein each query includes a WHERE clause having one or more predicates and wherein the analyzing processor organizes the predicates into column groups including either or both of value access groups and join access groups.

2. A system according to claim 1 wherein the index candidates include primary index candidates.

3. A system according to claim 1 wherein the analysing processor includes a search engine for performing a combinatorial search on the groups to reveal combinations, wherein each combination represents an alternative partitioning scheme.

4. A system according to claim 3 wherein the search engine identifies one or more index candidates for each partitioning scheme, each candidate having a primary index column.

5. A system according to claim 4 wherein the index candidates for each partitioning scheme include any one or more of:
   a candidate SELECT list containing the primary index column or columns and the keyword ROWID; and
   a candidate SELECT list containing the primary index column or columns and any remaining table columns or columns referenced by a particular one of the queries.

6. A system according to claim 1 including a costing processor for estimating a workload cost for each index candidate in the selection.

7. A system according to claim 6 wherein the costing processor:
   calculates estimated query costs for performing each query in the workload under each of the index candidates in selection; and
   derives from the calculation an estimated workload cost for the workload under each index candidate in the selection.

8. A system according to claim 6 wherein the analysing processor collects statistics on one or more column groups and the costing processor is responsive to the statistics for estimating the workload cost.

9. A system according to claim 6 including a ranking processor that is responsive to the costing processor for relatively ranking the selection of index candidates based on the estimated workload costs.

10. A system according to claim 9 wherein the ranking processor is responsive to the relative ranking for transmitting a signal indicative of one or more index candidates.

11. A system according to claim 10 wherein the signal is indicative of one or more index candidates having the lowest relative workload costs.

12. A system according to claim 6 including an emulator for providing simulations of the behaviour of the index candidates in the selection.

13. A system according to claim 12 wherein the costing processor uses the simulations for estimating the workload costs.

14. A method for identifying a selection of index candidates for a database, the method including the steps of:
  receiving data indicative of a workload defined by a plurality of queries;
  analysing the data for identifying a selection of index candidates, wherein each query of the plurality of queries includes a WHERE clause having one or more predicates; and
  organizing the predicates into column groups including either or both of value access groups and join access groups.

15. A method according to claim 14 wherein the index candidates include primary index candidates.

16. A method according to claim 15 wherein analysing the data includes analysing the predicates to identify one or more basic predicate types for the workload.

* * * * *